(12) United States Patent
Bennett

(10) Patent No.: US 8,108,698 B2
(45) Date of Patent: *Jan. 31, 2012

(54) COMPUTER STORAGE COMPONENTS THAT PROVIDE EXTERNAL AND INTERNAL ACCESS

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 794 days.

This patent is subject to a terminal disclaimer.

(21) Appl. No.: 12/182,804

(22) Filed: Jul. 30, 2008

(65) Prior Publication Data

US 2009/0307507 A1    Dec. 10, 2009

Related U.S. Application Data

(60) Provisional application No. 61/058,678, filed on Jun. 4, 2008.

(51) Int. Cl.
*G06F 1/00* (2006.01)
*G06F 11/30* (2006.01)
*G06F 13/00* (2006.01)

(52) U.S. Cl. .......... 713/300; 713/340; 711/100

(58) Field of Classification Search .......... 713/300
See application file for complete search history.

(56) References Cited

U.S. PATENT DOCUMENTS

| 5,539,535 A * | 7/1996 | Aizawa et al. ........ 358/468 |
| 5,969,438 A * | 10/1999 | Odaohara ........... 307/80 |
| 6,256,452 B1 * | 7/2001 | Yamamoto ........... 386/225 |
| 6,735,671 B1 * | 5/2004 | Kida ................ 711/111 |
| 6,934,863 B2 * | 8/2005 | Yin ................. 713/300 |
| 7,757,104 B2 * | 7/2010 | Kiyozaki ........... 713/300 |
| 2006/0224801 A1 * | 10/2006 | Chiu et al. ........... 710/70 |

* cited by examiner

*Primary Examiner* — Suresh Suryawanshi

(74) *Attorney, Agent, or Firm* — Garlick Harrison & Markison; Bruce E. Garlick

(57) ABSTRACT

A primary computing device and a secondary computing device couple with an internal storage component of the primary device powered by, and data accessed by either the first or secondary computing device. The internal storage component includes multiple connectors for connecting internal buses and external buses over which data can be accessed, internally or externally. It includes an internal storage unit (in general, at least one storage unit, and multiple storage units are supported) to which data can be written and from which data can be read. It also includes arbitration and isolation circuitry that makes it possible to access the internal storage unit (for read/write data access, etc.) over one of the buses. The arbitration and an isolation circuitry also facilitates powering the internal storage component employing power supplied by an internal power source, or via an external power source, such as power from an USB connection.

20 Claims, 8 Drawing Sheets

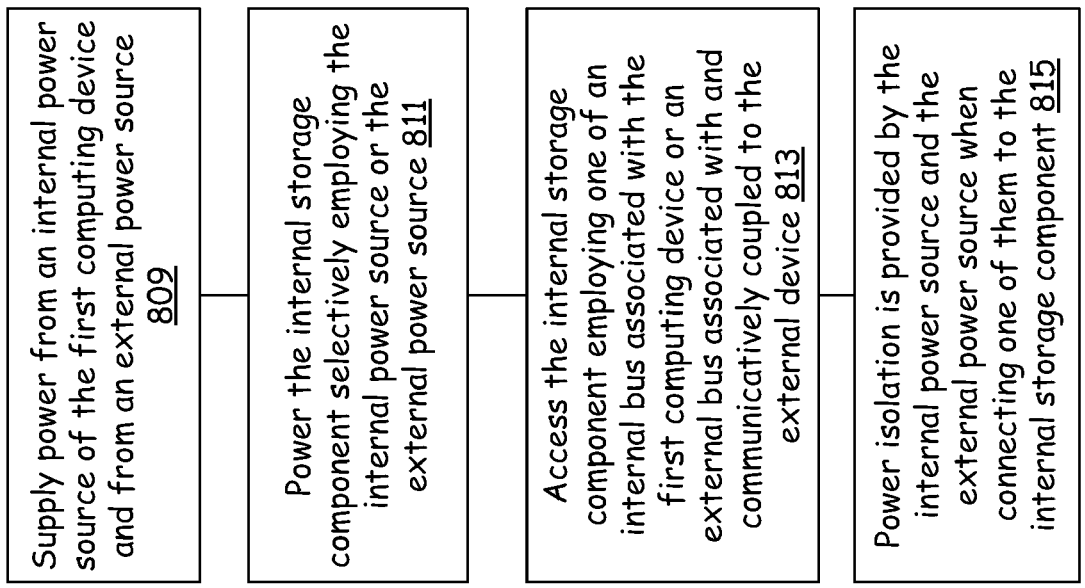

COMPUTER STORAGE COMPONENTS THAT PROVIDE EXTERNAL AND INTERNAL ACCESS

CROSS REFERENCES TO RELATED APPLICATIONS

The present application claims priority under 35 U.S.C. 119(e) to U.S. Provisional Application Ser. No. 61/058,678, filed Jun. 4, 2008, and having a common title with the present application, which is incorporated herein by reference in its entirety for all purposes.

Utility application Ser. No. 12/182,651 filed on even date herewith and entitled "ACCESS OF BUILT-IN PERIPHERAL COMPONENTS BY INTERNAL AND EXTERNAL BUS PATHWAYS"; and Utility application Ser. No. 12/183,243 filed on Jul. 31, 2008, and entitled, "REMOTE ACCESS TO AN INTERNAL STORAGE COMPONENT OF AN ELECTRONIC DEVICE VIA AN EXTERNAL PORT", both of which are incorporated herein by reference in their entirety for all purposes.

BACKGROUND OF THE INVENTION

1. Field of the Invention

This invention generally relates to computer architecture, and, more particularly, to the hard disk storage devices inside a computer or any computing device.

2. Related Art

Internal storage components are integral part of most present day electronic devices and computing devices. Electronic devices and computing devices that utilize at least one internal storage component include personal computers, notebook computers, tablet personal computers, set top boxes, video players, personal video recorders, televisions, palm PCs (Personal Computer), cell phones, PDAs (Personal Digital Assistants) and a variety of media players. Internal storage components that have permanent storage abilities come in many varieties, such as hard disk drives and flash memories.

Internal storage components have limited access, that is, they are accessed for reading and writing, typically only by internal processing circuitry of the electronic device or computing device. This limited accessibility restricts the internal storage components from being used when the device is powered down or not in a working condition. Even when they are in working condition and powered on, the limited accessibility of internal storage components restricts a user from quickly transferring data stored therein to another electronic device or computing device. For example, a user whose first notebook computer is not working, e.g., because it cannot be powered up, cannot access any data stored in it. One of the reasons is that the user is unable to access a hard disk drive that may be present in the first notebook computer. The user may not be able to continue his work using another personal computer or notebook computer unless the hard disk drive of the first computer is accessed by enabling the first notebook computer. The user would typically take the first notebook computer (that is not working) to a computer service center and have the hard disk drive removed and the contents transferred to a Compact Disc (CD), etc. The data recovery causes the user to lose valuable time and thus results in loss of business, work, and/or revenues.

Users sometimes transfer data from one computing device (that may not be operable) to another. One example of such transfer is when a user transfers hard disk drive contents from a personal computer to a notebook computer. Such transfer requires a removable storage device such as a pen drive, a CD (Compact Disc), a DVD (Digital Video Disc) or a portable hard disk drive that is large enough to handle the entire volume of the hard disk drive. Alternatively, the user may use a local area network connection to transfer the hard disk drive contents from one computer to another. A user that is not equipped with these facilities (memory stick, CD, LAN, etc.) or one who does not have enough time to take such measures would be unable to accomplish the data transfer.

Data transfer between computers/PCs/notebooks also requires application software to manage the data transfer between devices, and in particular, requires both computers to have applications that support the data transfer running. Also, sometimes, internal storage components of the computers are not compatible due to construct, size, or other characteristics. In addition, internal storage component drivers may not be available if the internal storage component is moved to a new device where the data is needed, and a custom designed internal storage component may not fit easily. These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation of a storage device comprising multiple buses that are further described in the following Brief Description of the Drawings, the Detailed Description of the Invention, and the Claims.

Features and advantages of the present invention will become apparent from the following detailed description of the invention made with reference to the accompanying drawings.

BRIEF DESCRIPTION OF THE DRAWINGS

FIG. 8 is a flow chart of an exemplary operation of an internal storage component in a computing device built in accordance with the present invention

DETAILED DESCRIPTION OF THE INVENTION

Figure 1:
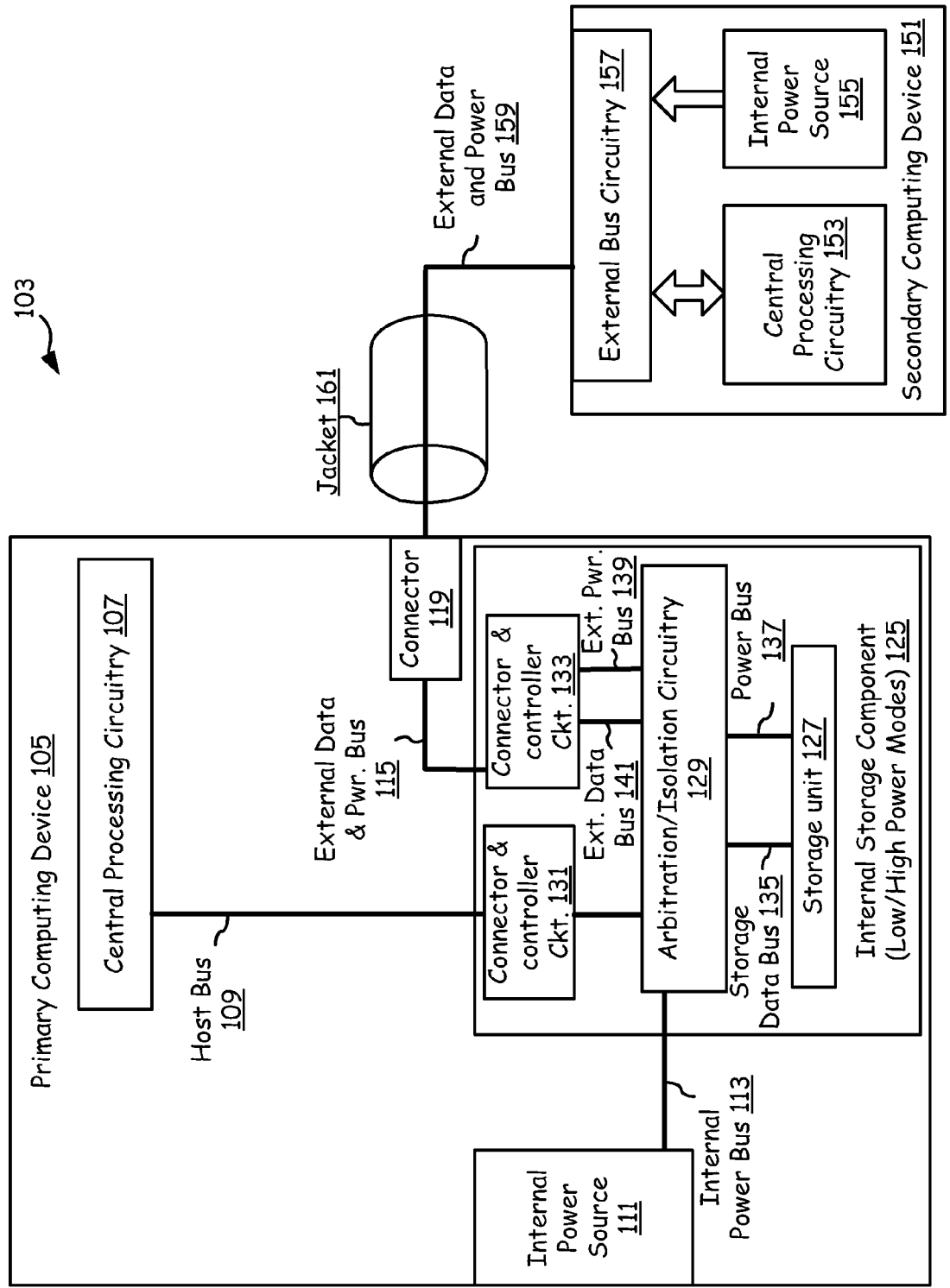
FIG. 1 is a block diagram of a local coupled network wherein a primary computing device and a secondary computing device are communicatively coupled and wherein an internal storage component in the primary device is powered by power supplied from the secondary computing device and data is accessed by the secondary computing device.

FIG. 1 is a block diagram of a local coupled network 103 wherein a primary computing device 105 and a secondary computing device 151 are communicatively coupled and wherein an internal storage component 125 in the primary computing device 105 is powered by power supplied from the secondary computing device 151 and data is accessed by the secondary computing device 151. The secondary computing device 151 includes central processing circuitry 153, an internal power source 155, and external bus circuitry 157. The external bus circuitry 157 of the secondary computing device 151 couples to connector 119 of the primary computing device 105 via an external data and power bus 159 that may be a cable having a jacket 161.

The internal storage component 125 includes multiple connectors (and controller circuits, hereinafter either "connectors," "ports," and/or "connector and controller circuits") 131 and 133 for connecting internal buses and external buses over which data (and power) can be accessed. The internal storage component 125 includes an internal storage unit 127 (in general, at least one storage unit, and multiple storage units are supported) to which data can be written and from which data can be read and arbitration/isolation circuitry 129 that makes it possible to access the internal storage unit 127 (for read/write data access, etc.) over one of the buses 131 or 133 (via external data bus 141). The arbitration/isolation circuitry 129 also facilitates powering the internal storage component 125 employing power supplied by an internal power source 111, or via an external power source, such as power from a Universal Serial Bus (USB) connection via external power bus 139.

In accordance with the present invention, internal storage component 125 may be accessed by the central processing unit 108 via the host bus 109 or by the secondary computing device 151 via the connector 119 and the external data & power bus 115. In one embodiment, the ports 131 and 133 service power, data, address and control signals. For example an internal storage component 125 with dual port support, supports one port 131 for connecting to an internal host bus 109 in the primary computing device 105 that provides internal data (data, address and control signals), an internal power bus 113, and another port 133 to an external bus 115 that services an external device, such as the secondary computing device 151, via connector 119. The internal storage component 125 conducts arbitration and isolation needed to support access from the multiple ports 131, 133. The internal storage component 125 includes arbitration & isolation circuitry 129 for arbitrating access, and isolating power supply, from one of the available ports 131 or 133. Support for power isolation makes it possible to use the storage device even when the primary computing device 105 (which can be a computer/PC or other device) is powered off or unavailable. Thus, the power needs of the internal storage component 125 may be met from an external system or from an internal power source 111.

If the primary computing device 105 is not plugged into a power source (or is somehow disabled), or if primary computing device 105 is powered off and is being carried in your computer case, there is now a way to access data stored in the internal storage component 125. For example, the secondary computing device 151, that is powered up and functional, can be connected employing the connector 119 (such as a USB connector) and an external data and power bus 159 (such as a USB cable). The data stored in the internal storage component 125 is now accessible to the secondary computing device 151. The secondary computing device 151 can be a PDA, a cell phone a laptop computer, etc.

There is no need for a specialized application software to manage the data transfer over the external data and power bus 159 between the primary computing device 105 and the secondary computing device 151. Thus, if the primary computing device 105 is dead or cannot be powered up, the data stored in the internal storage component 125 is still accessible from an external device that can supply power and interact over a cable.

In general, the internal storage device 125 supports multiple buses, including an internal host bus 109 and an external data and power bus 115. For example, the external data and power bus 115 is a USB bus that provides power as well as data connection, or an Ethernet bus that provides Ethernet connectivity as well as power. The internal storage device 125 includes one or more storage units 127. For example, it may include two SCSI storage units or an internal RAID storage unit. The internal storage device 125 is one of SCSI based HD, an ATAPI based HD, a FLASH based storage unit, a DVD based storage unit, a CD ROM drive, a removable drive, a floppy drive, an optical storage unit, a magnetic storage, etc. It is typically mounted inside the primary computing device 105.

The internal storage component 125 supports one or more buses, with arbitration provided between the buses to provide access to one bus at a time (for example). A bus typically includes two or more wires that are used in whole or in part to manage addressing, dataflow, control, and power. Some buses, such as USB provide power, while other buses, such as SCSI do not, and an internal power source 111 is used to provide an internal power over an internal power bus 113.

In a new internal storage component 125, in accordance with this invention, there may be two (or more) ports, and associated buses—for example, a left hand side port and a right hand side port, one plugged to a bus on the primary computing device 105, the other, via the connector 133, to connector 119 that is disposed on the housing of the primary computing device 105. A secondary computing device 151 that is external to the primary computing device 105 can now communicate using this connector 119. The internal storage component 125 may include two or more sets of connectors/ports. It employs a plurality of connector types and associated protocols for communication. For example, an USB connector/port 133 and a Firewire connector/port (not shown) may be provided on the internal storage component 125 in addition to the connector 131 employed for a host bus 109.

In general, the internal storage component 125 includes read-channel circuitry, one or more connector and control circuitry 131, 133, and arbitration and isolation circuitry 129. Attempting to write data to the internal storage component 125 involves encoding for high reliability, encryption for security, interface circuitry, etc.

In one embodiment, each bus feeds data into an appropriate arbitration block provided by the arbitration and isolation circuitry 129. One output of the arbitration and isolation circuitry 129 is the selected arbitration block (from among those available) which then goes into a read channel of the storage unit 127 via storage data bus 135. Similarly, power from an internal power source 111 and from external sources (provided over buses) goes into the arbitration and isolation circuitry 129 where power control and isolation is enforced via a power bus 137 that supplies power to the storage unit 127.

In one embodiment, the internal storage component 125 also includes a bridge to radio circuitry that facilitates communication with the secondary computing device 151, which seeks access to the internal storage component 125. The arbitration and isolation circuitry 129 arbitrates access between the host bus 109 and the external data and power bus 115 that terminates at the radio circuitry (instead of the connector 119), a wireless bridge provided at the radio circuitry providing wireless access from the secondary computing device 151 (that is external).

Figure 2:
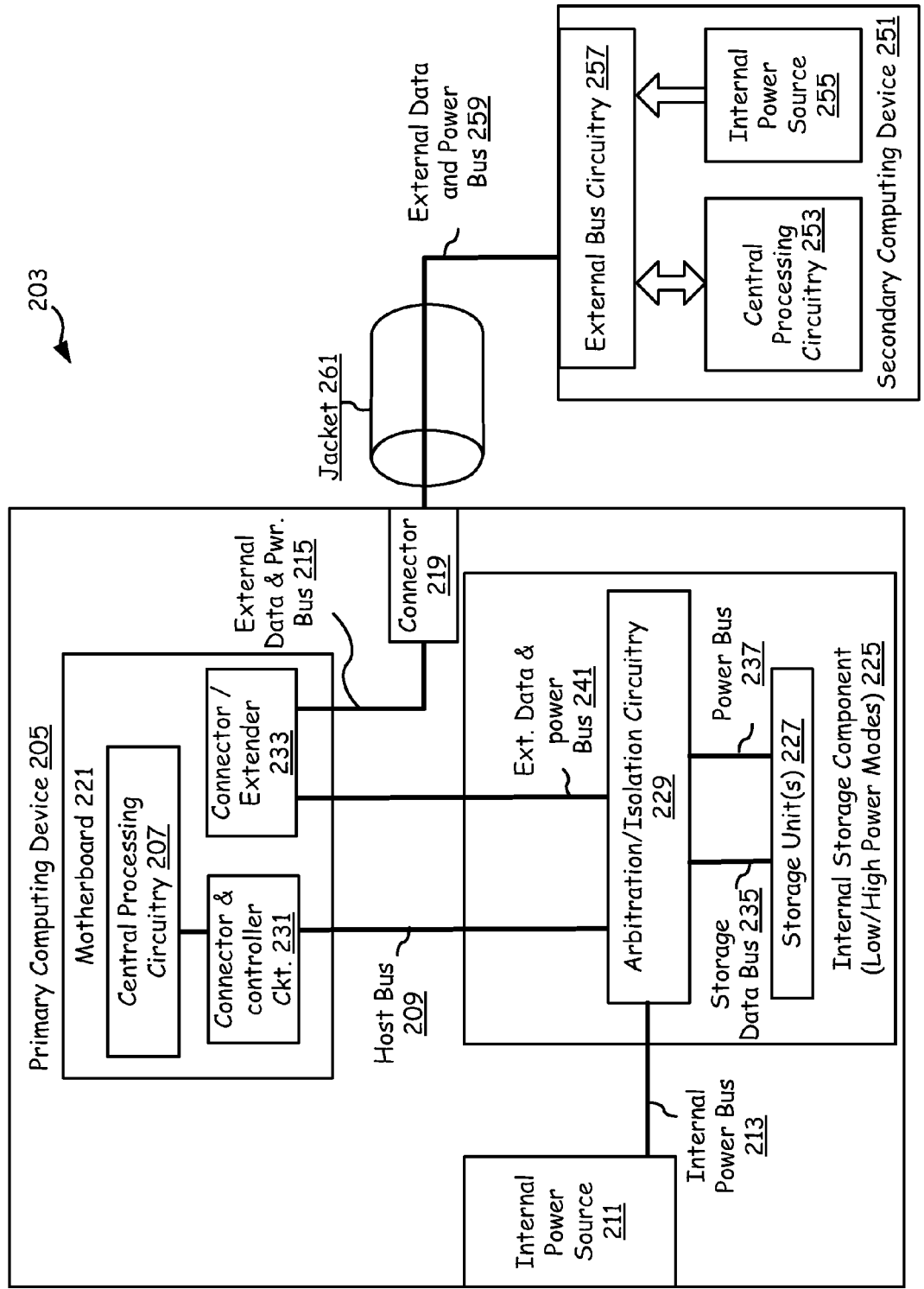
FIG. 2 is a block diagram of a local coupled network wherein a primary computing device and a secondary computing device communicatively couple and wherein a motherboard of the primary computing device includes a connector and control circuitry for a host bus as well as a connector/extender for an external data and power bus.

FIG. 2 is a block diagram of a local coupled network 203 wherein a primary computing device 205 and a secondary computing device 251 are communicatively coupled and wherein a motherboard 221 of the primary computing device 205 includes connector and control circuitry 231 for a host bus 209 as well as a connector/extender 233 for an external data and power bus 215 and external data and power bus 241. An internal storage component 225 in the primary computing device 205 is powered by power supplied from the secondary computing device 251, or by the internal power supplied over the internal power bus 213 by an internal power source 211. Data is accessed by the secondary computing device 251 by providing power if necessary over the external data and power bus 259. The primary computing device 205 extends the data and power bus 259 internally up to the internal storage component 225 via the connector/extender 233. The secondary computing device 251 includes central processing circuitry 253, an internal power source 255, and external bus circuitry 257, which couples the secondary computing device 251 to the primary computing device 205 via external data and power bus 259 using a cable that may have a jacket 261.

The internal storage component 225 includes arbitration and isolation circuitry 229 that makes it possible to arbitrate data access to storage units 227 between an internal host bus 209 and the one or more external data and power buses 241.

In general, the motherboard 221 includes central processing circuitry 207, connector & controller circuitry 231 that facilitates communication with the internal storage component 225 over the host bus 209, and one or more connectors 233 that facilitate data access from external devices coupled via external data and power bus 215 via connector 219. In one embodiment, the connector/extender 233 is a USB connector that extends the external USB connection all the way to the internal storage component 225. In one embodiment, the motherboard 221 also includes the arbitration & isolation circuitry 229 instead of such circuitry being included with the internal storage component 225.

Figure 3:
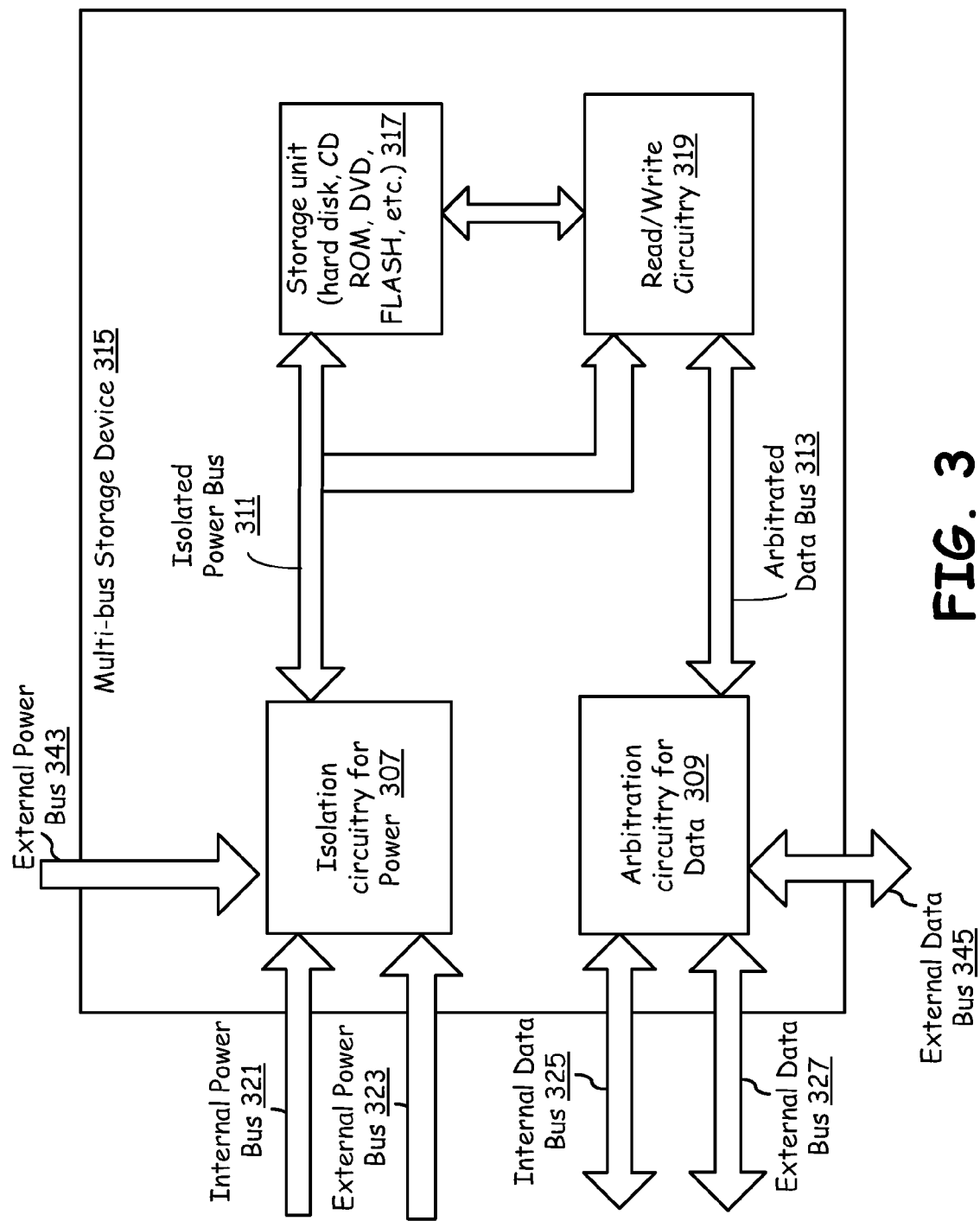
FIG. 3 is a schematic diagram of a multi-bus storage device built in accordance with the present invention that facilitates access to stored data over one of a plurality of buses that connect to it.

FIG. 3 is a schematic diagram of a multi-bus storage device 315 built in accordance with the present invention that facilitates access to stored data over one of a plurality of buses that connect to it. The multi-bus storage device 315 provides connectors for connecting to a plurality of power buses 321, 323, and 343, and to a plurality of data buses 325, 327, and 345, some of which may share common elements. Each bus may employ a different appropriate protocol, facilitating data access and data transfer. For example, a USB bus can be connected over a USB connector, a Firewire bus can be connected over a Firewire connector, a SCSI bus is connected over a SCSI connector, an IDE bus is connected over an IDE connector, an ATAPI bus is connected over an ATAPI connector, an Ethernet bus is connected over an Ethernet connector, etc.

The multi-bus storage device 315 includes one or more storage units 317, the access to which is managed and controlled by a read/write circuitry 319. Arbitration circuitry 309 arbitrates access to the read/write circuitry 319 among the plurality of data buses 325, 327, and 345 connected to/supported by the multi-bus storage device 315. An arbitrated data bus 313 (for data, control, addresses etc.) provides data to the read/write circuitry 319 while an isolated power bus 311 provides power to the read/write circuitry 319 and the storage unit 317. Isolation circuitry for power 307 selectively couples the external power bus 343, the internal power bus 321, and the external power bus 323 to the isolated power bus 311 and thereby selects one of the incoming power lines/cables as a source of power to the storage unit 317, the read/write circuitry 319, etc. In addition to selecting the incoming power supply, the isolation circuitry for power 307 isolates power provided by external power bus 343, internal power bus 321, and external power bus 323 such that a single one of these power buses provides power to the isolated power bus 311. The multi-bus storage device 315 operates as long as at least one external bus is plugged into a corresponding connector and at least one source of power is available.

Figure 4:
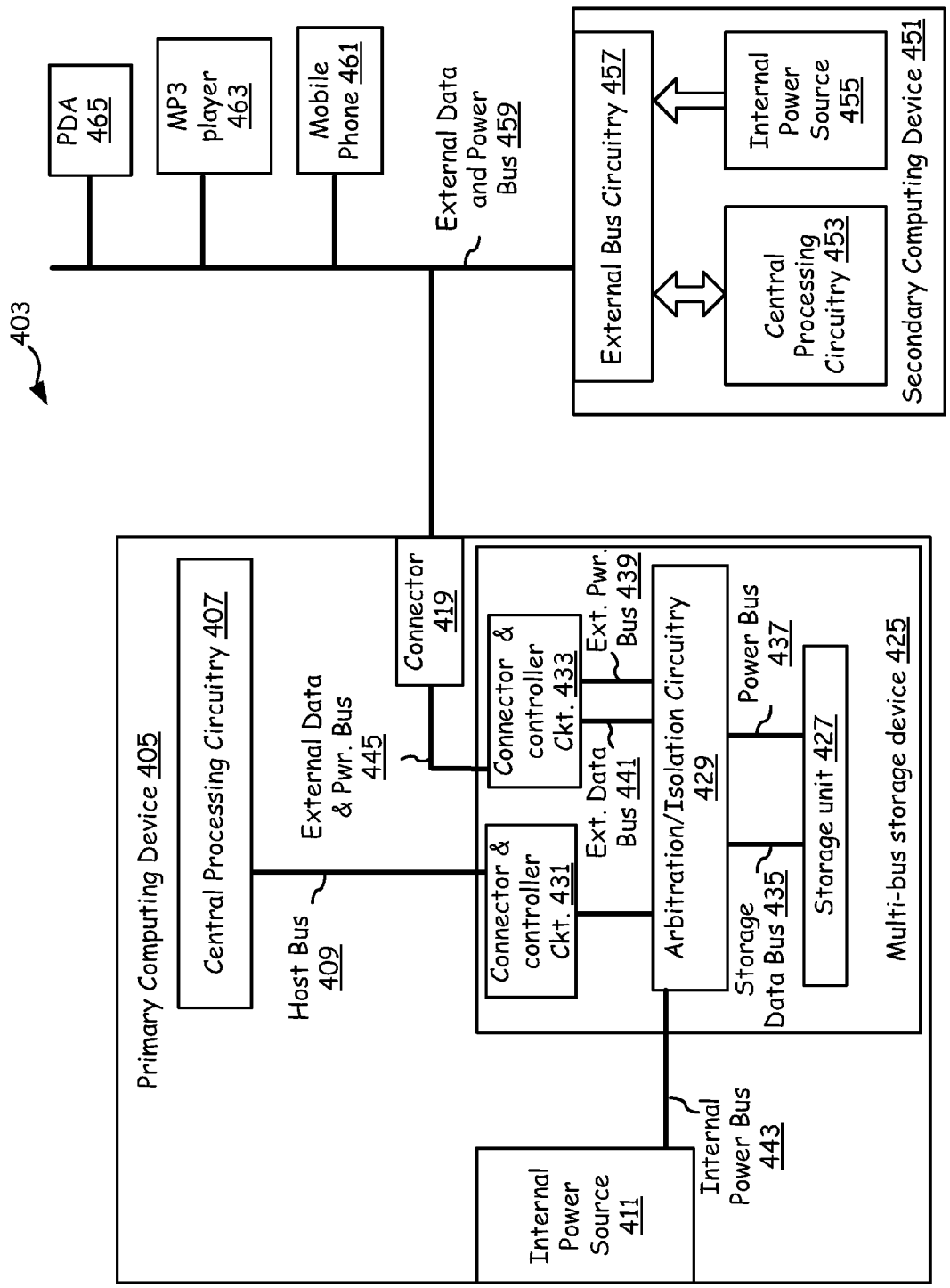
FIG. 4 is a block diagram of a local network wherein a primary computing device comprising a multi-bus storage device makes it possible to access the data stored in the multi-bus storage device from at least one of a plurality of other devices communicatively coupled to the computing device via a connector and an external data and power bus.

FIG. 4 is a block diagram of a local network 403 wherein a primary computing device 405 that includes a multi-bus storage device 425 makes it possible to access data stored in the multi-bus storage device 425 from at least one of a plurality of other devices communicatively coupled to the primary computing device 405 via a connector 419 and an external data and power bus 459. The primary computing device 405 is connected to a PDA 465, a MP3 player 463, a mobile phone 461, and a secondary computing device 451, all of which are capable of not only providing power to the multi-bus storage device 425 when necessary, but also capable of accessing the multi-bus storage device 425 for data storage and retrieval. The secondary computing device 451 includes central processing circuitry 453, an internal power source 455, and external bus circuitry 457 that couples the secondary computing device 451 to the external data and power bus 459.

The multi-bus storage device 425 includes arbitration & isolation circuitry 429 that arbitrates access to a storage unit 427 from the PDA 465, the MP3 player 463, the mobile phone 461 and the secondary computing device 451 when they are connected to the primary computing device 405 via the connector 419 and the external data and power bus 459. The arbitration & isolation circuitry 429 also isolates power delivered to the multi-bus storage device 425 from an internal power source 411 via internal power bus 443 and from the various external devices such as the PDA 465, the MP3 player 463, the mobile phone 461 that may also provide power to the multi-bus storage device 425.

Central processing circuitry 407 of the primary computing device 405 may also access the multi-bus storage device 425 via host bus 409. Connector and controller circuitries 431 and 433 couple to host bus 409 and external data and power bus 445, respectively. Connector and controller circuitry 431 provides access to the host bus 409 to the arbitration/isolation circuitry 429. Connector and controller circuitry 433 couples the external data and power bus 445 to external data bus and external power bus that couple to the arbitration/isolation circuitry 429. Arbitration/isolation circuitry 429 couples to storage unit 427 via storage data bus 435 and power bus 437.

Figure 5:
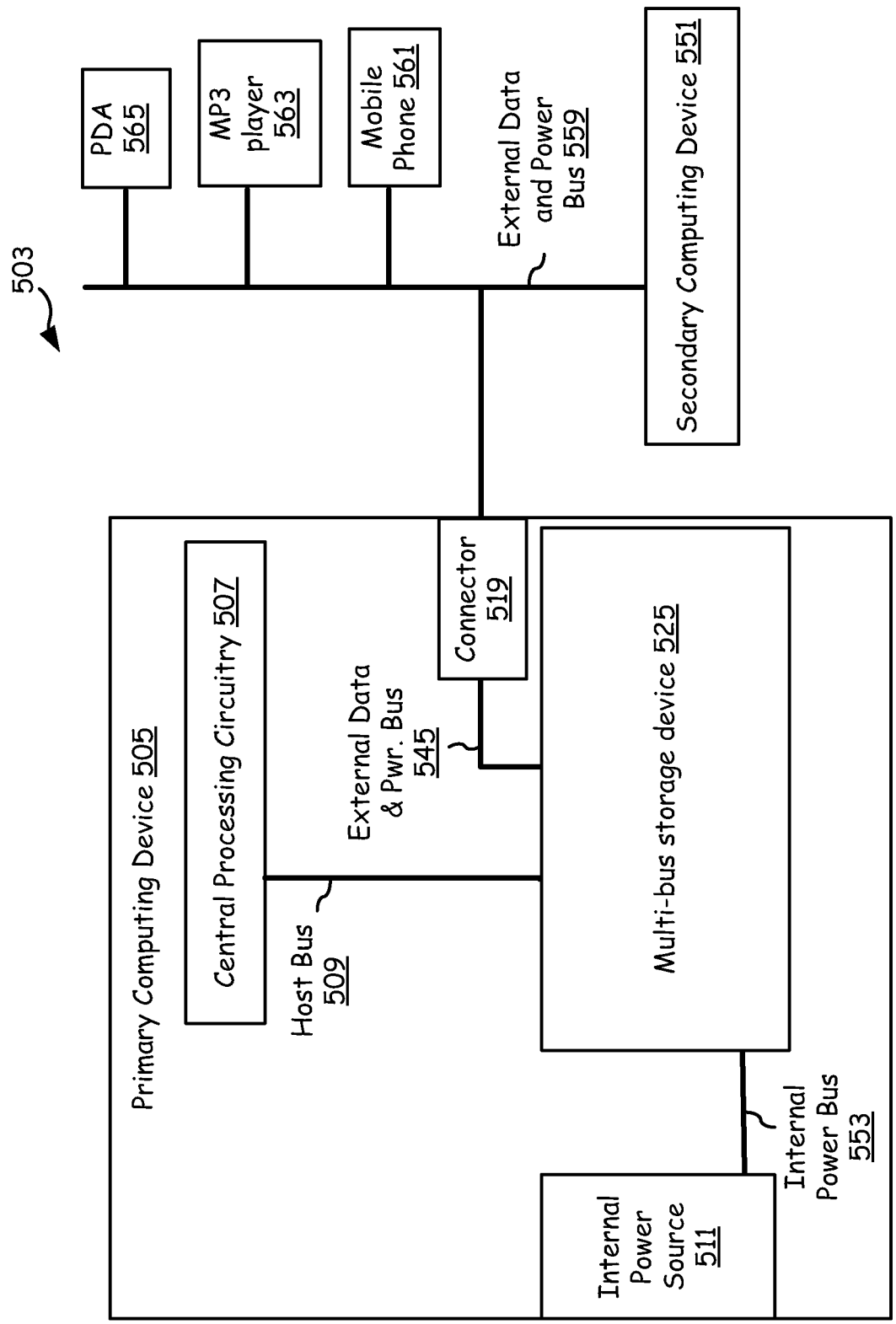
FIG. 5 is a block diagram of a local network wherein a primary computing device comprising a multi-bus storage device makes it possible to access the data stored in the multi-bus storage device from at least one of a plurality of other devices communicatively coupled to the primary computing device via a connector and an external data and power bus, wherein each of the other devices themselves include a multi-bus storage device that is accessed by the primary computing device.

FIG. 5 is a block diagram of a local network 503 having a primary computing device 505 that includes a multi-bus storage device 525 making it possible to access for a plurality of other devices 551, 561, 563, and 565 that couple to the primary device 505 via a connector 519 and an external data and power bus 559 to access the multi-bus storage device 525. Each of the other devices 551, 561, 563, and 565 may includes respective multi-bus storage that is accessed by the primary computing device 505. A PDA 565, a MP3 player 563, a mobile phone 561 and a secondary computing device 551 each include a multi-bus storage that is similar in functionality to the multi-bus storage device 535, providing access over the external data and power bus 559 to the primary computing device 505 and to each other. In addition, power is provided by one of these devices 565, 563, 561 and 551 to the primary computing device 505 and to each other, if necessary. Each of the devices 565, 563, 561 and 551 can provide power when necessary to another, and their internal multi-bus storage provides access to stored data to other devices.

The primary computing device 505 includes central processing circuitry 507 that couples to the multi-bus storage device 525 via host bus 509. Internal power source 511 provides power to the multi-bus storage device 525 via internal power bus 553. Connection 519, that may couple to external data and power bus 559 couples to multi-bus storage device 525 via external data and power bus 545 and provides both data and power coupling between the devices 551, 563, 561, and 551 to the multi-bus storage device 525.

Figure 6:
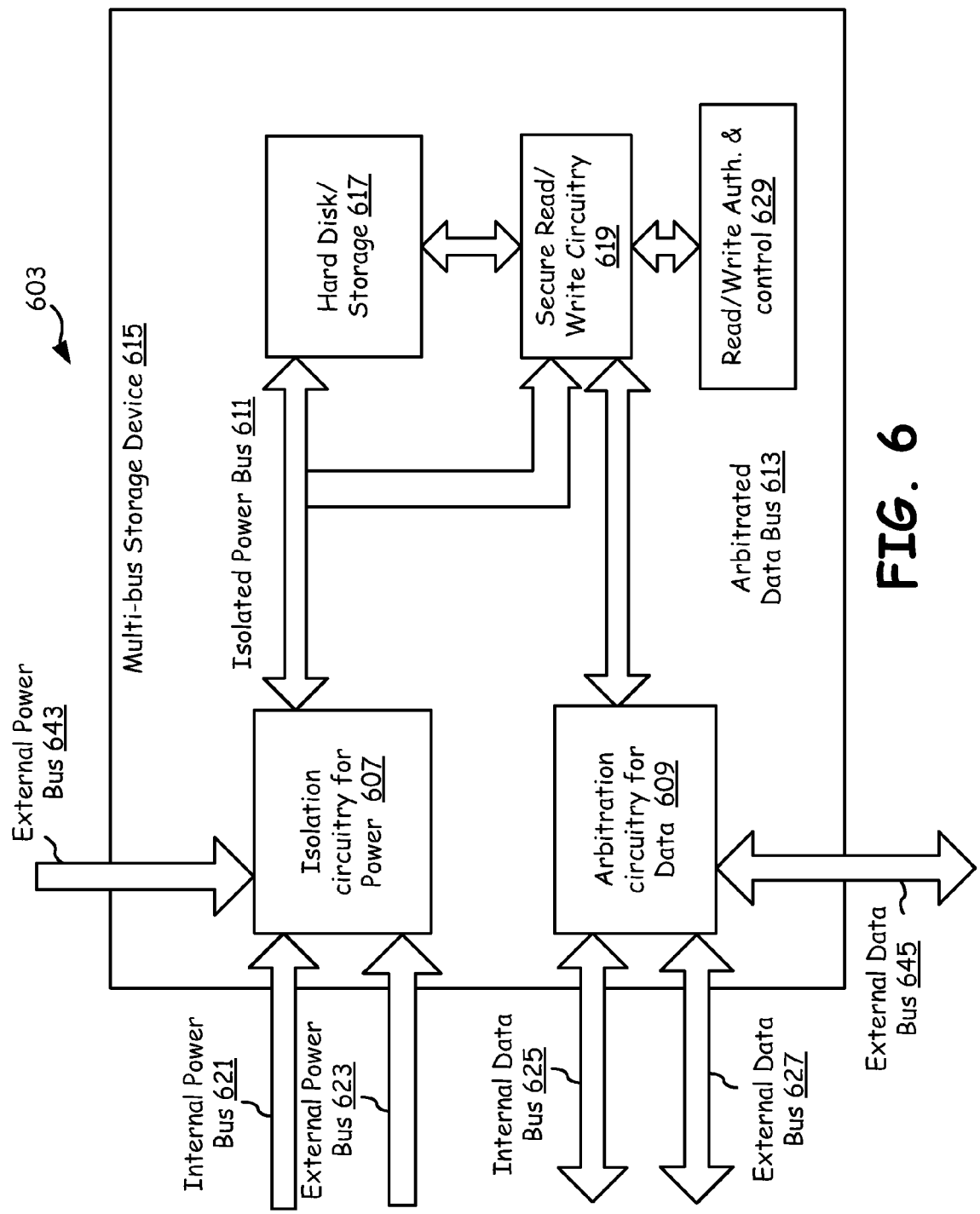
FIG. 6 is a schematic block diagram of a multi-bus storage device that facilitates authentication, control and secure data transfer from/to an internal bus and one or more external devices over appropriate buses.

FIG. 6 is a schematic block diagram of a multi-bus storage device 615 that facilitates authentication, control and secure data transfer from/to an internal bus 625 and one or more external devices over appropriate buses 627, 645. The multi-bus storage device 615 includes secure read/write circuitry 619 that makes it possible to encrypt data written to and decrypt data retrieved from a hard disk/storage 617. Security keys or certificates used for encryption/decryption are based on the external device or the internal bus 625 (or an internal application currently accessing) that reads/writes into the multi-bus storage device 615.

The multi-bus storage device 615 also includes a read/write authentication & control 629 that facilitates external device authentication, internal application authentication, control of data transfer, to and from the hard disk/storage 617. The multi-bus storage device 615 further includes arbitration circuitry for data 609 that arbitrates access to the hard disk/storage 617 between one or more buses 625, 627, and 645 requesting access to the hard disk/storage 617. The multi-bus storage device 615 further includes isolation circuitry for power 607 that is used to select one of the available power sources for supplying power to the hard disk/storage 617 from power buses 621, 623, and 643 and for providing power isolation from such buses when not in use.

Figure 7:
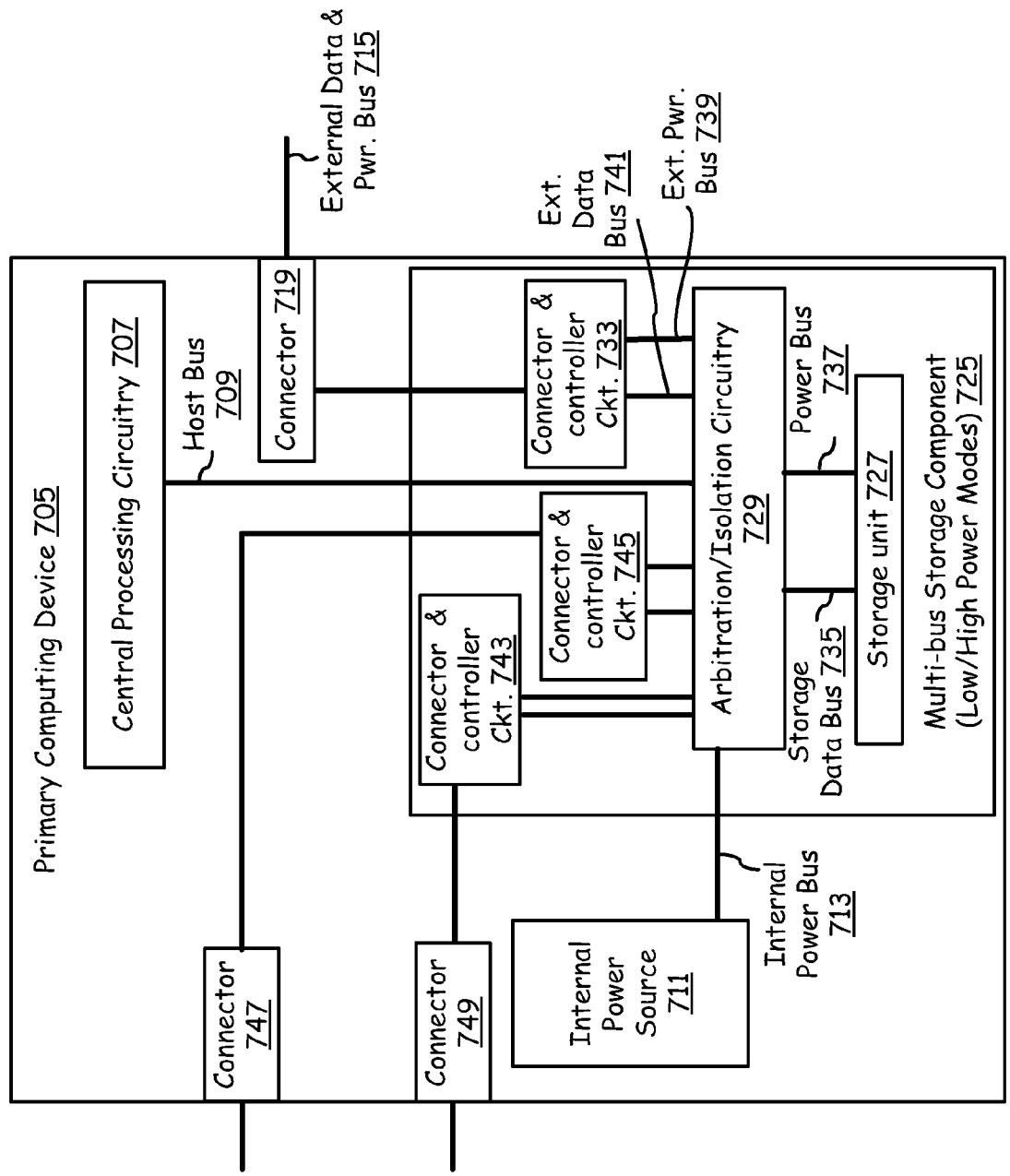
FIG. 7 is a block diagram of a primary computing device that includes a multi-bus storage component that is capable of simultaneously connecting to one or more internal and external devices over appropriate connectors and buses while arbitrating access to a storage unit.

FIG. 7 is a block diagram of a primary computing device 705 that includes a multi-bus storage component 725 that is capable of simultaneously connecting to one or more internal and external devices over appropriate connectors and buses while arbitrating access to a storage unit 727. The primary computing device 705 includes a plurality of connectors 747, 749, and 719 that each connect a corresponding external device to the multi-bus storage component 725 thereby providing access for storage and retrieval of data and for selective power delivery to the multi-bus storage component 725.

The multi-bus storage component 725 includes a plurality of connector & controller circuitries 743, 745, 733, each employed to support a corresponding data transfer protocol and cable. The multi-bus storage component 725 also includes arbitration and isolation circuitry 729 that facilitates selection of one of the external devices, or an internal host bus 709, for access to a storage unit 727 that stores data. The arbitration and isolation circuitry 729 also selects one of the power lines provide by the connector and control circuitry 743, 745, 733 and an internal power bus 713 (fed by internal power source 711) as a source of power to the storage unit 727. In general, one or more external devices can access the multi-bus storage component 725 via appropriate connectors 747, 749, and 719 and the corresponding control circuitry 743, 745, 733, respectively.

FIG. 8 is a flow chart of an exemplary operation of an internal storage component in a computing device built in accordance with the present invention. The operation starts at a block 809 when the computing device starts supplying power from an internal power source of the first computing device and from an external power source associated with an external device via an external connector. Then, at a next block 811, power is supplied to the internal storage component selectively employing one of the internal power source or the external power source. This implies that one of the available power sources is selected, based on come criteria or configurations. Then, at a next block 813, the internal storage component provides access to data employing one of an internal bus associated with the first computing device or an external bus associated with and communicatively coupled to the external device. Thus, one of these two devices, employing appropriate buses and protocols, is able to access data stored, with arbitration provided by an arbitration circuitry in the internal storage component.

Then, at a next block 815, power isolation is provided by an isolation circuitry in the internal storage component between the internal power source and the external power source, when connecting one of them to the storage units controlled by the internal storage component. Processing then terminates after the end of the data access.

As one of average skill in the art will appreciate, the term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality.

Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A storage device for storing data in a computing device, the storage device comprising:
    a storage unit;
    arbitration/isolation circuitry coupled to the storage unit;
    a plurality of data connectors coupled to the arbitration/isolation circuitry, each of the plurality of data connectors connecting to a corresponding bus and at least one of the plurality of data connectors connecting to an internal bus of the computing device;
    a plurality of power connectors connected to the arbitration/isolation circuitry and to the storage unit via the arbitration/isolation circuitry, the storage device provided power by one of the plurality of power connectors via the arbitration/isolation circuitry; and
    the arbitration/isolation circuitry arbitrating storage unit data access requests from the plurality of data connectors and selecting one of plurality of data connectors for data access.

2. The storage device of claim 1 wherein one of the plurality of power connectors is coupled to an internal power bus associated with an internal power source of the computing device and wherein another of the plurality of power connectors is coupled to a bus that delivers power from an external power source associated with a different computing device.

3. The storage device of claim 1 wherein the at least one of the plurality of data connectors capable of connecting to an internal bus of the computing device provides access to a host bus associated with a processing circuitry of the computing device.

4. The storage device of claim 1 wherein at least one of the plurality of connectors is a USB connector that is capable of being coupled to a USB bus that provides data access to another computing device via an external USB connector disposed on an outer surface of the computing device.

5. The storage device of claim 4 wherein at least one of the plurality of power connectors is a power connector that is capable of being coupled to a power bus that provides power from another computing device via the external USB connector disposed on the outer surface of the computing device.

6. The storage device of claim 1 further comprising:
    a plurality of controllers; and
    each of the plurality of data connectors capable of connecting to a corresponding bus and controlled by a corresponding one of the plurality of controllers.

7. The storage device of claim 1, wherein the arbitration/isolation circuitry arbitrates simultaneous data access requests.

8. The storage device of claim 1 wherein:
    the computing device is one of a laptop computer, a personal computer, a cellular phone, a Personal Data Assistant, and a MP3 player; and
    the plurality of connectors include a Universal Serial Bus (USB) based connector.

9. A computing device comprising:
    processing circuitry;
    an internal power source;
    a multi-bus storage device that includes:
        a storage unit;
        read/write circuitry coupled to the storage unit; and
        data and power isolation circuitry coupled to the storage unit and to the read/write circuitry and coupled to receive power from a plurality of power sources;
    an external connector disposed on a surface of the computing device;
    an external data bus connecting the external connector to the data isolation circuitry of the multi-bus storage device;
    an external power bus connecting the external connector to the power isolation circuitry of the multi-bus storage device;
    an internal data bus connecting the processing circuitry to the data isolation circuitry of the multi-bus storage device;
    an internal power bus connecting the internal power source to the power isolation circuitry of the multi-bus storage device; and
    the data and power isolation circuitry of the multi-bus storage device arbitrates data access between the external data bus and the internal data bus and selects one of the internal power bus or the external power bus as a source of power for the multi-bus storage device.

10. The computing device of claim 9 wherein the external connector is one of a Universal Serial Bus (USB) based connector, an Ethernet based connector, and a Firewire based connector.

11. The computing device of claim 9 wherein the data isolation circuitry and the power isolation circuitry are part of the multi-bus storage device.

12. The computing device of claim 9 further comprising a motherboard that contains the processing circuitry, the data isolation circuitry, and the power isolation circuitry.

13. The computing device of claim 11 wherein the power isolation circuitry powers the storage unit with power delivered from an external device coupled to the computing device via the external connector when the internal power source is inoperative.

14. The computing device of claim 13 wherein the data arbitration circuitry provides data access by the external device to the storage unit via the external data bus and the external connector when the internal power source is inoperative.

15. A method for operating an internal storage component of a computing device, the method comprising:
    supplying power from an internal power source of the computing device and from an external power source associated with an external device via an external connector;
    an arbitrator powering the internal storage component selectively employing the internal power source or the external power source; and
    the arbitrator accessing the internal storage component employing one of an internal bus associated with the first computing device or an external bus associated with and communicatively coupled to the external device.

16. The method of operating an internal storage component of claim 15 wherein accessing comprises:
- enabling connection to the internal storage component from the internal bus and the external bus to the internal storage component;
- monitoring requests for data from the internal bus and the external bus; and
- arbitrating access to the internal storage component between the internal bus and the external bus.

17. The method of claim 15 further comprising isolating power from a non-power-providing one of the internal power source and the external power source.

18. The method of claim 15 wherein the internal storage component is one of a hard drive, a CDROM drive, a DVD drive, an optical drive, a FLASH drive, a magnetic drive, and a RAM.

19. The method of claim 18 wherein the external connection is a Universal Serial Bus (USB) based port.

20. The method of claim 15, wherein accessing the internal storage component comprises arbitrating requests for data access to the internal storage component between a plurality of external buses and the internal bus.

* * * * *